Oct. 2, 1951     T. W. KUNZOG     2,569,531
BALL BEARING STRUCTURE
Filed Feb. 4, 1947

INVENTOR.
THEODORE W. KUNZOG
BY
*Spencer Hardman & Fehr*
*his Attorneys.*

Patented Oct. 2, 1951

2,569,531

UNITED STATES PATENT OFFICE 2,569,531

BALL-BEARING STRUCTURE

Theodore W. Kunzog, Dayton, Ohio, assignor to General Motors Corporation, Detroit, Mich., a corporation of Delaware Application February 4, 1947, Serial No. 726,274

1 Claim. (Cl. 308—235)

This invention relates to bearings and is particularly concerned with ball bearings and self-lubricated spacer cages for said bearings.

It is, therefore, the primary object of the invention to provide a ball bearing assembly, of the ball thrust type, which includes therein a self-lubricated cage for the balls, which cage also acts as a spacer.

In carrying out the above object, it is a further object to provide a highly porous metal spacer cage formed from a sintered substantially non-compacted metal powder, which cage is substantially an annulus of porous metal having radially disposed apertures therethrough for receiving the balls and spacing the balls from one another in the ball thrust bearing assembly.

Another object, in some instances, is to provide a spacer cage wherein an annular cupped sheet metal member is used which carries therein and has bonded thereto highly porous metal.

Further objects and advantages of the present invention will be apparent from the following description, reference being had to the accompanying drawings wherein preferred embodiments of the present invention are clearly shown.

In ball thrust bearing assemblies, the usual structure consists of two races held within a casing which races have a plurality of balls therebetween. These balls are spaced from one another by means of a cage wherein pieces of felt material are disposed between the balls, which absorbent material is lubricated with a bearing grease. This provides lubrication for the balls and the races and assures long wear of the assembly.

In the manufacture of such assemblies, the use of the felt and other absorbent material is not desirable since it is difficult to assemble, becomes matted, limiting use of the material, and sometimes hardens through elevated temperature conditions and reaction with the grease, the main objection to the felt is the expense of assembling the structure wherein a plurality of small felt pieces must be properly placed within the cage and between the balls and wherein each felt piece must be prelubricated with a bearing grease. Further, felt has a limited retention of lubrication which prevents any substantial quantity of grease being present.

My invention is directed to the elimination of the past difficulties through the use of a porous metal ring made from sintered-substantially-non-compacted metal powders which ring has a dual function of acting as a spacer for the balls and also the lubricating medium. Thus, it is possible to eliminate the felt and the sheet metal spacer cage when using my improved spacer and lubricating device. Further, my improved lubricating and spaced device is strong, easy to assemble and may be manufactured with slight difficulty and of any desired porosity within reasonable limits. For particular details used in connection with the spacer, reference may be had to the Davis Patent No. 2,220,641, Koehring Patent No. 2,198,253, Koehring Patent No. 2,198,702 and Olt 2,273,589 which are directed to specific metal powders and methods of using said powders. All of these patents are assigned to the assignee of the present invention.

Figure 1:
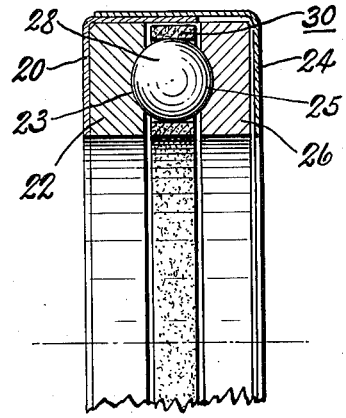
Fig. 1 is a fragmentary view in section of a ball thrust bearing assembly.
Figure 2:
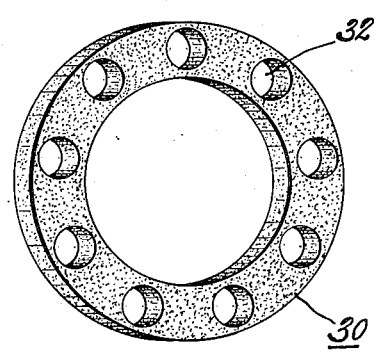
Fig. 2 is a self-lubricated spacer cage used in the assembly of Fig. 1.

Referring specifically to Fig. 1, a fragmentary view in section of a ball thrust bearing is shown wherein an outer casing 20 supports a race 22, which casing 20 is telescoped into a casing 24 that supports a second race 26. Between races 22 and 26, which are preferably of hardened steel with opposed facings, annular bearing grooves 23 and 25 respectively are disposed so as to accommodate a plurality of ball bearings 28 therebetween. Bearings 28 are held spaced from one another by means of a spacer 30 shown in detail in a perspective view, Fig. 2. The spacer 30 is merely an annular disc of highly porous metal made from sintered non-compacted metal powder which disc has a plurality of equally spaced radially disposed apertures 32 therethrough, which apertures have a diameter slightly greater than the diameter of the ball bearings. The outer diameter of the spacer 30 is but slightly less than the inside diameter of outer casing 20 so that there is but slight clearance therebetween. This clearance is preferably in the order of from 5 to 20 thousandths of an inch, and is of some importance since when the porous metal is impregnated with grease or other impregnating medium, there is a tendency during operation for the impregnating material to be thrown outwardly due to centrifugal force and if the clearance is too great between the casing and the periphery of the spacer, substantial quantities of impregnant will be drawn off the spacer thereby starving the bearings at such time. By maintaining a clearance within reasonably small limits, no appreciable quantity of grease is drawn from the spacer thereby assuring continued adequate lubrication of the bearings. Additional grease may be forced into the spacer when needed by merely placing the entire ball thrust bearing on a suitable fixture and supplying grease thereto under pressure. The porosity of the porous metal spacer is always present in differentiation to felt type lubricators which may be torn or deteriorated with age. In this manner the present assembly is useful throughout the life of the bearings.

As stated before, the porous metal lubricator also acts as a spacer means for the ball bearing to radially dispose them therearound equally distant from one another. The porous metal part is strong and completely adequate to fulfill the requirements of a spacer together with the dual requirements of a lubricator.

Figure 4:
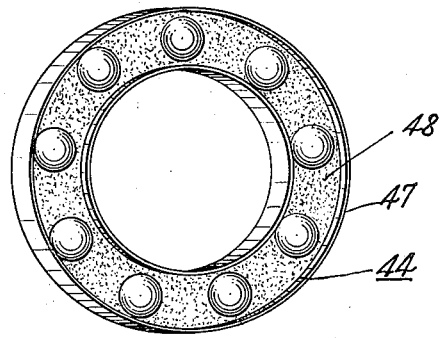
Fig. 4 is a view of the self-lubricating spacer cage used in connection with the assembly shown in Fig. 3.
Figure 3:
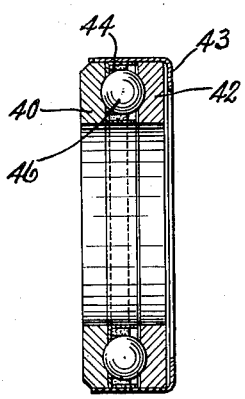
Fig. 3 is a view in section of another embodiment of the invention.

Another embodiment of the invention is shown in Fig. 3 wherein races 40 and 42 are provided together with a casing 43 which fits snugly over the races 40 and 42. A spacer shown at 44 is used for the ball bearings 46. The spacer 44 is shown in more detail in Fig. 4 wherein it will be noted that a cupped sheet metal annulus is used as a base as designated at 47, which annulus has the cupped portion thereof substantially filled with metal powder that is sintered therein into highly porous metal 48. Koehring Patent 2,198,253, discloses the method for bonding substantially non-compacted metal powder to steel which method can be successfully utilized in the manufacture of the part.

The steel annulus 47 includes a plurality of equally spaced radially disposed apertures therethrough and in the manufacture of the part, these apertures are placed over graphite or oxidized chome steel pins whereupon the metal powder is sprinkled therearound in the desired depth and sintered after which the pins can be removed leaving apertures in the porous metal of sufficient diameter to permit passage of the balls therethrough.

The use of this embodiment is suggested when the quantity of porous metal used is desired to be reduced since the cupped sheet metal retainer 47 is used as a means for preventing centrifugal elimination of the impregnant from the porous metal thereby permitting a smaller diameter retainer ring to be used. Thus, this particular embodiment may be used in certain instances where rather small diameter ball thrust bearings are required.

In either embodiment shown herein, the basic invention resides in the use of a porous metal object of annular shape which acts simultaneously as a ball bearing retainer and spacer or lubricator.

Porous metal bodies disclosed herein may be made from any suitable metal. Obviously the best results can be obtained from the use of bearing retainers, such as, bronze. Thus a porous ring may be made from sintered mixtures of copper-tin powders. The ring may be made from porous iron coated with copper, pure copper, copper metal alloys and, in fact, any metal which has desirable characteristics, both physical and frictional for the specific use of the part.

Another advantage of the porous metal lubricator is the fine porosity thereof whereby the capillary action of the pores is sufficient with usual grades of lubricants to maintain said lubricants therein when the structure is at rest. This is not true of filled lubricators which permit bleeding-off of the lubricant when thinner grade SAE oils are used.

While the embodiments of the present invention as herein disclosed constitute preferred forms, it is to be understood that other forms might be adopted, all coming within the scope of the claim which follows.

What is claimed is as follows:

A ball thrust bearing assembly, comprising in combination; two ball races on a common axis having disposed therebetween a plurality of ball bearings, and a lubricating spacer for said balls consisting of; a sheet metal annulus and having regularly spaced apertures therethrough and having a trough-like cross section formed by upturned opposed walls wherein said trough is at least partially filled with a continuous layer of sintered non-compacted metal powder which is metallurgically bonded to said sheet metal annulus, said sintered metal having regularly spaced molded apertures therethrough in alignment with the apertures in said annulus and being adapted to cooperate with said annulus for retaining said balls in spaced freely rotatable relation to one another, said sintered metal being impregnated with a lubricant which is retained by capillarity therein when the assembly is not rotating and which is prevented from centrifugal expulsion by the outer wall of said sheet metal annulus when the assembly is in rotation.

THEODORE W. KUNZOG.

REFERENCES CITED

The following references are of record in the file of this patent:

UNITED STATES PATENTS

| Number | Name | Date |
|---|---|---|
| 1,958,725 | Stein | May 15, 1934 |
| 2,029,445 | Schubert | Feb. 4, 1936 |
| 2,038,009 | Smith | Apr. 21, 1936 |